United States Patent Office 3,623,411
Patented Nov. 30, 1971

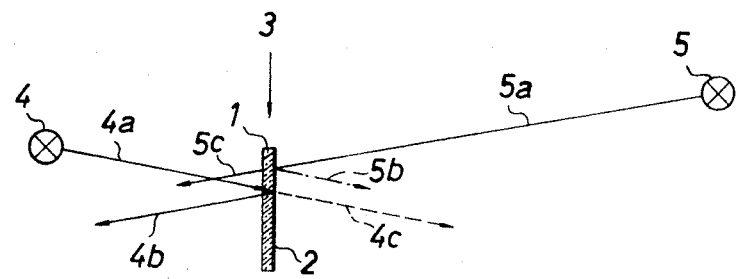
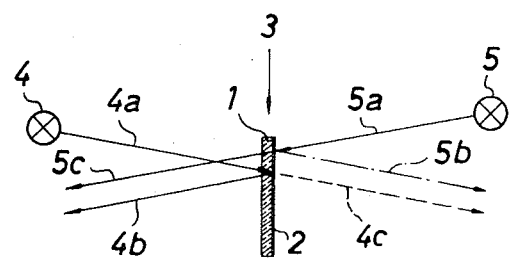
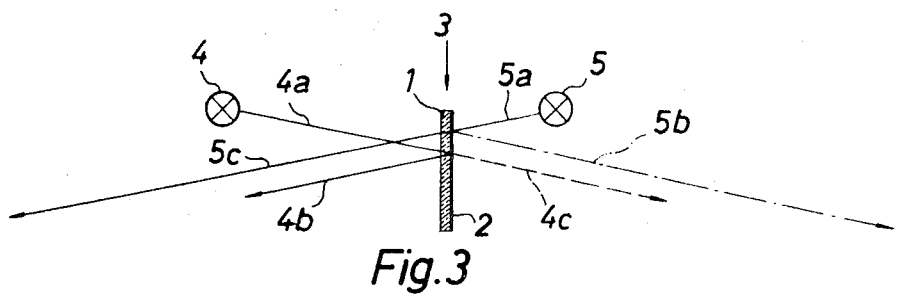

3,623,411
APPARATUS FOR DETERMINING THE VISUAL INTENSITY OF LIGHT
Hans Gunther, Georg Konigl, Hans Kortner, Klaus Nicolay, and Hubert Hackenberg, Munich, Germany, assignors to Agfa-Gevaert Aktiengesellschaft, Leverkusen, Germany
Filed July 29, 1969, Ser. No. 845,690
Claims priority, application Germany, July 31, 1968,
P 17 72 999.6
Int. Cl. G01j 1/14; G03b 7/00
U.S. Cl. 95—10 B                              27 Claims

ABSTRACT OF THE DISCLOSURE

Apparatus for determining the visual intensity of light comprises an indicator including one or more interference mirrors which respectively transmit and reflect light in a first and a second range of the visible spectrum. One side of each mirror is exposed to light from a reference light source and the other side of each mirror can be exposed to light issuing from an unknown source, particularly to scene light, whereby the color of light coming from the mirror or mirrors (including transmitted light from the unknown source and reflected light from the reference source, or vice versa) changes as a function of and indicates changes in the intensity of light from the unknown source.

BACKGROUND OF THE INVENTION

The present invention relates to apparatus for measuring or determining the visual intensity of light, and more particularly to improvements in photometer type apparatus for measurement of the quantitative characteristics of light. Still more particularly, the invention relates to improvements in apparatus which can be employed in still cameras or in motion picture cameras to furnish visual indications of the intensity of scene light.

SUMMARY OF THE INVENTION

An object of our invention is to provide an apparatus which can furnish clear, readily detectable and accurate information pertaining to the intensity of unknown light sources.

Another object of the invention is to provide an apparatus which is sufficiently compact to be readily accommodated in a still camera or motion picture camera.

A further object of the invention is to provide an apparatus for determining the intensity of scene light which can be utilized to effect appropriate adjustments of the shutter and/or diaphragm in a still camera or motion picture camera.

An additional object of the invention is to provide an apparatus which is particularly suited to indicate the intensity of scene light in a photographic apparatus, especially to indicate that intensity which is just sufficient for making of automatic exposures.

Still another object of the invention is to provide an apparatus of the just outlined character which can be utilized in a photographic apparatus to pinpoint those parts of a scene or subject which are too bright or too dark for making of satisfactory exposures at a particular setting of the shutter and/or diaphragm.

A concomitant object of the invention is to provide an apparatus which can be installed in a camera in such a way that the readings representing various intensities of scene light can be observed in the view finder.

Still another object of the invention is to provide an apparatus which can furnish different types of readings, particularly those including combinations of two or more colors and one or more symbols.

The invention is embodied in a photometer type apparatus for determining the visual intensity of light and comprising essentially an indicator having at least one preferably plate-like interference mirror positionable to place one of its sides into the path of light issuing from an unknown light source, and a reference light source positioned to direct light against the other side of the mirror whereby the color of light coming from the mirror (and including transmited light from the unknown source and reflected light from the reference source, or vice versa) changes as a function of and indicates changes in intensity of light to which the one side of the mirror is exposed.

In accordance with a presently preferred embodiment of the apparatus, the mirror reflects light in a first range of the visible spectrum and transmits in a second range of such spectrum light whose color contrasts the color of reflected light. It is further preferred to employ one or more mirrors which are substantially free of absorption so that the reflected light is complementary to the transmitted light and the visible color of the mirror is white when the intensity of transmitted light from the unknown source subsantially equals the intensity of reflected light from the reference source or vice versa.

One or more color filters can be placed in the path of transmitted and/or reflected light so that the visible color of the mirror or mirrors is not a white color even if the reflected light complements the transmitted light.

Each mirror preferably comprises a selective interference layer and a plate-like light transmitting carrier which may constitute a color filter. The layer preferably absorbs light in a certain range of the visible spectrum. It is also possible to place light dispersing means into the path of light at one side of one or more mirrors.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a diagrammatic partly elevational and sectional view of an apparatus which embodies one form of the invention;

FIG. 2 is a similar view but showing the unknown source of light in a different position;

FIG. 3 is a similar view but showing the unknown source of light in a third position;

DESCRIPTION OF THE PREFERRED EMBODIMENTS

Figure 4:
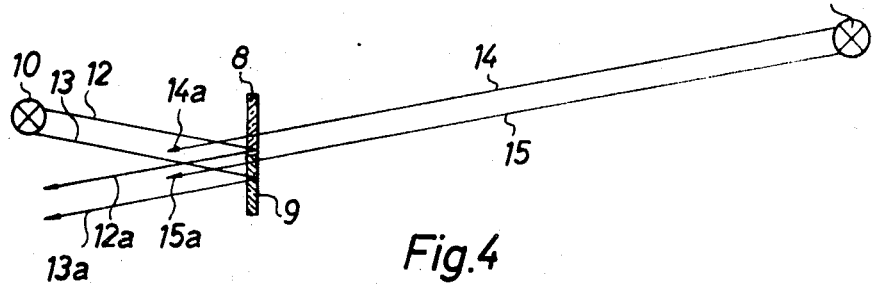
FIG. 4 is a diagrammatic partly elevational and partly sectional view of a second apparatus wherein the indicator comprises two interference mirrors.

Referring to FIG. 1, there is shown a plate-like light transmitting carrier 1 one side of which is coated with a multi-ply selective interference layer 2 to form therewith an interference mirror 3 which constitutes an indicator. The layer 2 is reflective in a certain frequency range of the visible spectrum; for example, from the green to the red (above ca. 550 nanometers=millimicrons). The layer 2 permits passage of green to violet light (wave length below ca. 550 nm.). Thus, the reflected color of the mirror 3 is yellow and its transmission color is blue. If the carrier 1 is free of absorption, the reflected and transmitted spectral ranges complement each other and their mixing produces white color.

The apparatus of FIG. 1 further comprises a reference light source 4. An identical light source 5 is located at a variable distance from the mirror 3. These light sources are located at the opposite sides of the mirror 3 and the reference light source 4 is placed at a fixed distance from the carrier 1 so that it directs light of known intensity against the layer 2.

The reference light source 4 emits a light beam 4a which is divided into rays 4b, 4c when it reaches the layers 2. The ray 4b is reflected and the ray 4c is transmitted; the ray 4b is yellow and the ray 4c is blue. The distance between the light source 5 and the layer 2 exceeds considerably the distance between the layer 2 and the reference light source 4. Therefore, the light beam 5a issuing from the source 5 produces a yellow ray 5b which is reflected at the mirror 3 and a blue ray 5c which passes through the carrier 1. Since the intensity of the ray 5c is weak (the source 5 is distant from the mirror 3), the yellow color of the ray 4b prevails so that the mixture of rays 4b and 5c appears as yellow light. The transmitted light rays 4c, 5b produce blue light because the color of the light ray 4c prevails.

In FIG. 2, the layer 2 is located exactly or substantially midway between the light sources 4 and 5. Since the intensity of light beams 4a, 5a is the same, the intensity of rays 4b, 5c is also the same. The same applies for the light rays 4c, 5b. Thus, the light rays 4b, 5c produce white light.

In FIG. 3, the light source 5 is placed so close to the mirror 3 that the intensity of the light ray 5c exceeds the intensity of the light ray 4b. Consequently, these light rays produce blue light.

It was found that the apparatus of FIGS. 1 to 3 enables the human eye to distinguish between a very large number of intensities of visual light which is emitted by an unknown light source (i.e., the source 5). This is due to the fact that, contrary to the operation of presently known photometric measuring systems which compare light densities and/or contrasts, the structure of FIGS. 1 to 3 furnishes a distinct and clear color hue to which the human eye can readily react with a high degree of accuracy. In order to reduce the dependency of incoming light from the direction of entry, the left-hand surface of the carrier 1 (namely, that surface which faces the reference light source 4) is designed as the light dispersing surface. Thus, the carrier 1 may constitute a light dispersing element. The color of light (rays 4b, 5c or 4c, 5b) coming from the mirror 3 changes as a function of and indicates the changes in intensity of light to which the left-hand side of the carrier 1 is exposed.

The sensitivity of the improved apparatus can be enhanced by employing an indicator having two interference mirrors with complementary light transmitting characteristics. As shown in FIG. 4, the indicator comprises two interference mirrors 8, 9 each of which is constructed in the same way as the mirror 3 of FIGS. 1 to 3, i.e., each thereof comprises a light transmitting carrier and a multiply selective interference layer. However, the mirror 8 transmits the blue part of visible light and reflects yellow light whereas the mirror 9 transmits yellow light and reflects blue light. The boundary between the transmitted and reflected regions is located at the wave length of approximately 550 nm. In the absence of balance (when the two mirrors appear to be white), the contrast between the colors of the mirrors 8, 9 is a function of the lighting conditions.

The mirrors 8, 9 are located between a fixed reference light source 10 and a second light source of identical intensity. The numerals 12, 13 denote two light beams which issue from the reference source 10 and respectively impinge on the mirrors 8 and 9. Portions of these beams are reflected, as at 12a and 13a. The color of the light ray 12a is yellow and the color of the light ray 13a is blue. The transmitted rays were omitted for the sake of clarity.

The light source 11 emits light which is represented by the beams 14, 15 respectively impinging on the mirrors 8 and 9. The transmitted portions or rays of these light beams are shown at 14a and 15a; these respectively appear to be blue and yellow. The reflected portions of the light beams 14, 15 were omitted. Since the source 11 is remote from the mirrors 8 and 9, the intensity of transmitted light rays 14a, 15a of the beams 14, 15 is low so that the colors of the reflected light rays 12a, 13a prevail. Thus, the mirror 8 will appear yellow and the mirror 9 will appear blue.

If the source 11 is moved closer to the mirrors 8 and 9, the intensity of transmitted light rays 14a, 15a increases until it matches the intensity of reflected light rays 12a, 13a. The two mirrors then appear white. If the source 11 is moved still nearer to the mirrors 8, 9, the intensity of transmitted light rays 14a, 15a prevails, i.e., the mirror 8 then appears blue whereas the mirror 9 appears yellow.

Figure 5:
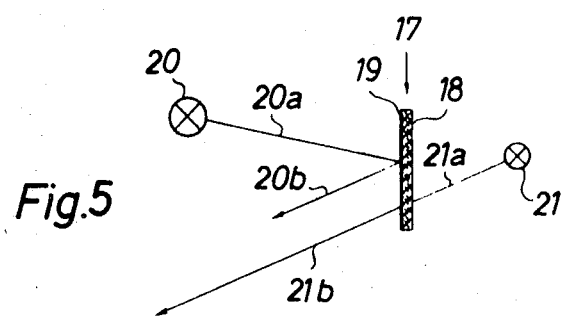
FIG. 5 is a diagrammatic partly elevational and partly sectional view of a third apparatus wherein the carrier of the interference mirror constitutes a filter.

The apparatus of FIG. 5 employs an indicator having an interference mirror 17 whose carrier 18 constitutes an absorption filter. The carrier 18 is provided with an interference layer 19 which is designed to reflect a narrow zone of the visible spectrum. In order to produce a clear color contrast, the layer 19 reflects red light and the carrier 18 consists of yellow glass which absorbs blue light. The mirror 17 appears to be green by looking through it and red when looking at it.

The two light sources are shown at 20 and 21. The source 21 is placed very close to the mirror 17 to simulate an object of high brightness. The light beam 20a which issues from the reference light source 20 is partially reflected in the layer 19 and the reflected portion of ray 20b appears to be red. The transmitted portion of the light beam 20a has been omitted for the sake of clarity. The source 21 emits a light beam 21a which is partly transmitted (at 21b) and appears as green light. Since the intensity of the transmitted ray 21b exceeds the intensity of the reflected ray 20b, the light which is observable at the left-hand side of the mirror 17 appears to be green. When the intensity of the light source 21 matches that of the reference light source 20, the intensity of green ray 21b equals that of the red ray 20b so that the mirror 17 appears to be yellow. By moving the source 21 further away from the mirror 17, the color of the ray 20b prevails so that the mirror 17 appears to be red. The yellow filter 18 insures that the color of the mirror 17 is other than white color even if the intensity of transmitted light (21b) matches the intensity of reflected light (20b).

Figure 6:
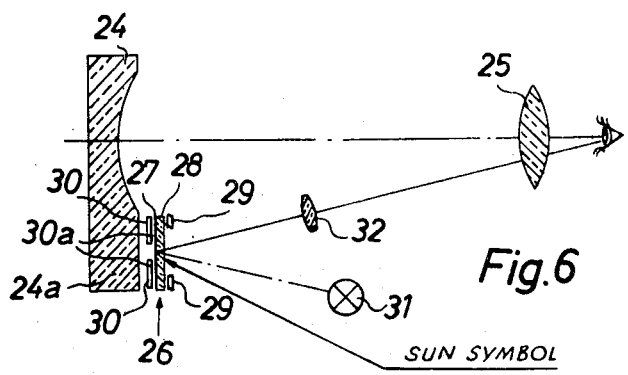
FIG. 6 is a longitudinal central vertical sectional view of a view finder in a still camera or motion picture camera and of a fourth apparatus whose indicator is observable in the view finder.

FIG. 6 illustrates a view finder for use in photographic apparatus. The view finder comprises a negative objective lens 24 and a positive eyelens 25. The objective lens 24 has a planoparallel extension 24a which is located behind a light measuring apparatus including an interference mirror 26 composed of a yellow carrier 28 and a multiple interference layer 27. The right-hand side of the carrier 28 is matted to reduce the directional dependency of light which comes from the mirror 26. The matted side of the carrier 28 is provided with a mask 29. A second mask 30 is provided between the extension 24a and the mirror 26; this second mask is formed with a fully reflecting surface 30a which faces the layer 27 on the carrier 28. The reference light source comprises an incandescent lamp 31. A further lens 32, which constitutes an auxiliary magnifier, is located in the field of view of the person looking through the eyelens 25 toward the mirror 26 to furnish an enlarged image of the light measuring apparatus.

The light which issues from the reference source 31 passes through the carrier 28 and is partially reflected by the layer 27. The remainder of such light passes through the layer 27. This layer is designed in such a way (and the yellow color of the carrier 28 is such) that the mirror 26 reflects the red portion of the visible spectrum and transmits pronounced green light. The red portion of light coming from the reference source 31 is reflected in the region of the mirror 26 but the green portion of such light passes through the mirror 26 and is reflected on the mirror surface 30a. The thus reflected green light passes through the layer 27 and carrier 28 and thereupon through the magnifying lens 32 to reach the eyelens 25 together with the reflected red portion of reference light. The two lights (red and green) produce yellow light so that the visible portion of the mask 30 appears to be yellow.

The non-obstructed area surrounded by the mask 30 appears green, yellow or red, depending on the prevailing lighting conditions. If the scene light entering the view finder lens 24 from the outside (i.e., from the left) is bright, the green portion of light which passes through the layer 27 and carrier 28 prevails so that the observation area within the mirror 30a appears green. The mask 30 appears yellow. If the intensity of scene light decreases so that the intensity of green light passing through the mirror 26 toward the eyelens 25 matches the intensity of red light which issues from the reference light source 31 and is reflected by the layer 27 to enter the eye by way of the lens 32, the entire area seen by the eye through the lens 32 appears yellow. The arrangement may be such that the presence of yellow light in and around the area surrounded by the mask 30 indicates to the operator of the camera the lower limit of that scene brightness which is satisfactory for making automatic exposures. If the scene brightness decreases still further, the red light issuing from the reference source 31 and reflected by the mirror 26 prevails, i.e., the user of the camera sees a dot of red light surrounded by yellow light. This serves as a "stop" signal to warn the user that the scene brightness is unsatisfactory for automatic exposures.

An advantage of the just described apparatus is that the (yellow) color of the mask 30 remains unchanged irrespective of changes in scene brightness so that the color of this mask can be directly compared with the (green, yellow or red) color in the area within the mask. This contributes to greater accuracy of measurements.

A color blind or inexperienced photographer can utilize a camera which embodies the features of FIG. 6 if the field within the mask 30 is provided with an appropriate symbol (e.g., a symbol representing the sun) which disappears when the color (yellow) of the mask 30 is matched by the color (yellow) which reaches the eye by passing through the objective lens 24, mirror 26 and lenses 32, 25. The sun symbol on the right-hand side of the carrier 28 is indicated by a legend. The mask 29 forms part of or is secured to the housing of the camera. Such housing accommodates the entire view finder.

Figure 7:
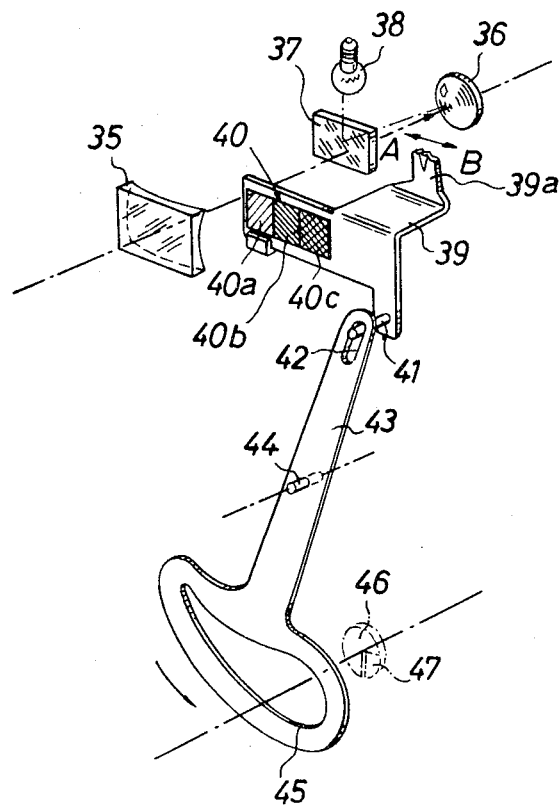
FIG. 7 is a fragmentary perspective view of a photographic apparatus wherein the apparatus for determining the visual intensity of scene light comprises an adjustable filter which can adjust the diaphragm.

Referring to FIG. 7, there is shown a portion of a still camera or motion picture camera having a view finder including an objective lens 35 and an eyelens 36. The interference mirror 37 of the apparatus for determining visual intensity of scene light is located between the lenses 35, 36 and a reference light source, such as a light bulb 38, is installed to direct light against the right-hand side of the mirror 37. A multi-stage neutral grey filter 40 is mounted on a slide or holder 39 and can be moved across the path of incoming scene light between the lens 35 and mirror 37. The filter comprises portions 40a, 40b, 40c of different opacity, i.e., the light transmissivity of median portion 40b exceeds that of the portion 40a but is less than that of the portion 40c. However, the light transmissivity of each of the portions 40a, 40b, 40c is uniform in each zone thereof. A handgrip portion 39a can be manipulated to move the slide 39 in directions indicated by the double-headed arrow A–B to thereby place the filter portion 40a, 40b or 40c into registry with the lens 35. A pin 41 of the slide 39 extends into a slot 42 in one arm of a two-armed lever 43 which constitutes a diaphragm vane and is fulcrumed at 44. The other arm of the vane 43 has a horn-shaped opening 45 which can be moved with reference to an objective lens 46 and a fixed vane 47. The vanes 43, 47 together constitute an adjustable diaphragm adapted to define a range of apertures each having a size depending on the angular position of the vane 43.

The function of the mirror 37 is the same as that of the mirror 26. Thus, a person looking through the eyelens 36 can see one of three different colors, depending on the scene brightness. In the illustrated embodiment the mirror 37 is designed in such a way that the observer can see red, yellow or green light. The scene light which enters by way of the lens 35 is divided at the mirror 37 in such a way that red light is reflected and the green light passes through the lens 36 and into the observer's eye. Red light issuing from the reference source 38 is reflected by the mirror 37 and mixes with the green portion of incoming scene light. Since the filter 40 is movable across the path of incoming scene light, its portions 40a, 40b, 40c can reduce the intensity of that part of scene light which reaches the mirror 37 to the extent depending on selected position of the slide 39. Thus, when the intensity of incoming scene light is within a predetermined range, the user can balance the scene light which reaches the eye with reference light which is reflected by the mirror 37 by moving one of the filter portions 40a–40c into registry with the lens 35. Thus, one of the filter portions 40a–40c will cause such drop in intensity of scene light that the eye will detect only yellow light. If the light observed by the eye is green, the user moves a denser filter portion in front of the mirror 37; if the visible light is red, a less dense filter portion is moved across the path of incoming scene light. The corresponding movements of the slide 39 are transmitted to the vane 43 by way of the pin-and-slot connection 41–42, i.e., the aperture size is a function of the position of the filter 40 with reference to the mirror 37.

It is clear that the diaphragm (vanes 43, 47) constitutes but one component of the exposure value setting means which can be adjusted in response to adjustment of the filter 40 with reference to the mirror 37. The exposure value setting means may further include an adjustable shutter (not shown) which can be adjusted in response to movement of the filter 40 to change the exposure time. Such adjustment of the shutter can be effected in addition to or instead of adjustment of the diaphragm. The camera housing has been omitted for the sake of clarity.

Figure 8:
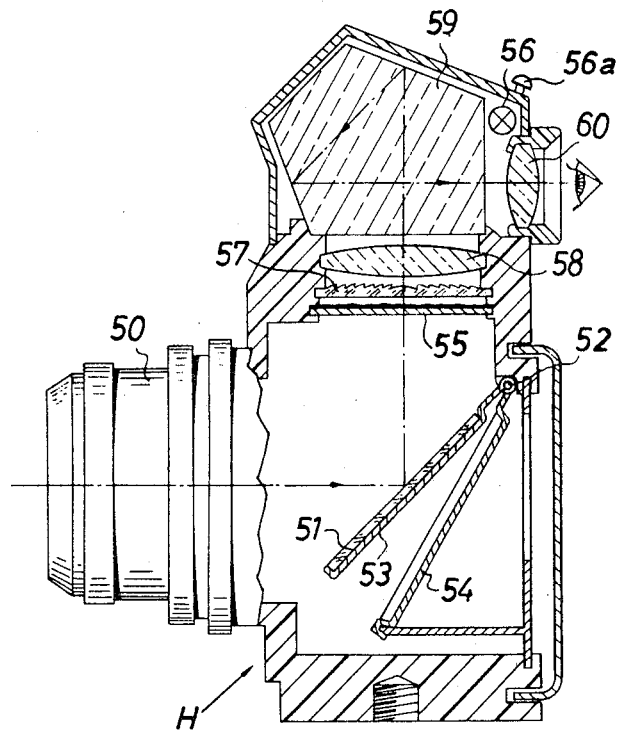
FIG. 8 is a sectional view of a single lens reflex camera which embodies another form of the apparatus.

FIG. 8 shows a single lens reflex camera. The camera objective 50 admits scene light into the interior of the housing H whereby such light impinges on a mirror 51 and is reflected in a manner as indicated by phantom lines. The mirror 51 is mounted on a base plate 53 which is hinged to the housing H, as at 52. A flap or lid 54 is provided behind the carrier 53 to prevent uncontrolled entry of light into the housing. The lid 54 is also pivotable on the hinge 52.

The housing H further accommodates an interference mirror 55 which is installed above the pivotable mirror 51 and extends across the entire path of light which enters the view finder. The mirror 55 forms part of the apparatus which determines and indicates the brightness of scene light. A reference light source 56, preferably an electric lamp, is mounted above the eyelens 60 of the view finder. A Fresnel lens 57 is provided in the view finder duct to facilitate adjustments of the sharpness of viewed images. The view finder further comprises a magnifier lens 58 and an inverting prism 59.

The parts of the camera are shown in positions they assume prior to making of an exposure. The interference mirror 55 enables the user to determine the distribution of brightness in the area which is to be photographed. This mirror acts not unlike the aforedescribed mirrors 26, 37, i.e., the color of areas whose brightness is higher is different from the color of areas of medium or low brightness. The color representing low scene brightness is substantially complementary to the color which represents high light intensity. The (third) color of portions whose brightness is of meduim value is a mixture of the other two colors of identical intensity.

If the reference light source 56 is selected in such a way that the third color indicates satisfactory exposure of film which is being used in the camera, the observer can see at a glance all those portions of the scene whose illumination is excessive or insufficient at the particular setting of the shutter and/or diaphragm, i.e., all those portions which would be underexposed and overexposed on the film. All necessary corrections can be carried out by appropriate adjustments of the diaphragm. Also, the reference source 56 may be adjustable; for example, the intensity of light issuing from the source 56 can be regulated by a variable resistor whose moveable part is coupled to the diaphragm. Furthermore, adjustments in intensity of light issuing from the reference source 56 can be utilized to effect adjustments of exposure time (shutter) or to change one or both exposure values in the same way as is customary to account for the speed of a particular film. The regulating means which can be actuated by hand to change the intensity of the reference light source 56 includes a knob 56a.

If an interference mirror is used in a manner as described in connection with FIG. 8, i.e., to indicate the brightness of various parts of the viewed scene or subject, the sensitivity of the color change can be enhanced still further by utilizing an indicator 61 of the type shown in FIG. 9. This indicator comprises an interference mirror 62 of the type shown in preceding illustrations and a grey filter 63 overlapping a portion of the mirror 62 at that side which is exposed to scene light. The reference light source is shown at 64. It will be seen that the light transmissivity of the upper portion of the indicator 61 exceeds the transmissivity of the lower portion which includes the grey filter 63. Similar results can be achieved by using an indicator wherein the reflectivity of one portion exceeds or is less than the reflectivity of at least one other portion. The reference light source 64 is preferably an incandescent lamp.

Figure 9:
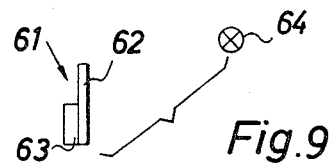
FIG. 9 is a diagrammatic elevational view of a portion of a further apparatus.

The indicator 61 of FIG. 9 can furnish a particularly clear reading in the range of transition brightness because the colors of the two parts of the mirror 62 alternately contrast each other. If the colors are green, yellow and red, one obtains the following combinations: At a maximum scene brightness, both parts of the mirror 62 appear green. If the scene brightness decreases, the lower part which is overlapped by the filter 62 becomes yellow but the upper part remains green. In response to a further reduction in scene brightness, the lower part of the mirror 62 becomes red and the upper part appears yellow. Both parts of the mirror 62 become red if the scene brightness decreases further.

It is clear that the improved measuring apparatus is susceptible of many additional modifications. For example, the filter 40 can be replaced with a filter whose light transmissivity varies gradually rather than stepwise. Furthermore, the regulating knob 56a of FIG. 8 can be used to adjust the shutter and the camera of FIG. 8 may include the filter 40 of FIG. 7 as a means for adjusting the diaphragm, or vice versa. Still further, the camera of FIGS. 6, 7, 8 or 9 can embody the apparatus of FIG. 4. Thus, if the mirror 62 of FIG. 9 is replaced with the mirrors 8, 9 of FIG. 4 and the thus modified apparatus is installed in the housing H of FIG. 8, the grey filter 63 of FIG. 9 overlies the mirror 8 or 9.

Without further analysis, the foregoing will so fully reveal the gist of the present invention that others can, by applying current knowledge, readily adapt it for various applications without omitting features which fairly constitute essential characteristics of the generic and specified aspects of our contribution to the art.

What is claimed as new and desired to be protected by Letters Patent is set forth in the appended claims:

1. In a photometer type apparatus for determining visual intensity of light, a combination comprising an indicator including at least one interference mirror having a first side and a second side and being positionable to place said first side into the path of light issuing from an unknown light source; and a reference light source positioned to direct light against said second side whereby the color of light coming from at least one side of said mirror indicates the intensity of light to which said first side is exposed, such color being changeable as a function of changes in the intensity of light to which said first side of said mirror is exposed.

2. A combination as defined in claim 1, wherein said mirror reflects light in a first range of the visible spectrum and transmits light in a second range of the visible spectrum, the color of transmitted light being contrasting of the color of reflected light.

3. A combination as defined in claim 2, wherein said mirror is substantially free of absorption and wherein the transmitted light is complementary to the reflected light so that the visible color of the mirror is white when the intensity of transmitted light from the unknown source substantially equals the intensity of reflected light from said reference source, and vice versa.

4. A combination as defined in claim 2, wherein the transmitted light is complementary to the reflected light so that the visible color of the mirror is white when the intensity of transmitted light from the unknown source substantially equals the intensity of reflected light from said reference source or vice versa, said indicator further comprising color filter means located in the path of reflected light from one of said sources so that the color of said mirror deviates from white even if the intensity of transmitted light from one of said sources equals the intensity of reflected light from the other source.

5. A combination as defined in claim 2, wherein the transmitted light is complementary to the reflected light so that the visible color of said mirror is white when the intensity of transmitted light from one of said sources substantially equals the intensity of reflected light from the other source, said indicator further comprising color filter means located in the path of transmitted light from one of said sources so that the color of said mirror deviates from white color even if the intensity of transmitted light from one of said sources equals the intensity of reflected light from the other source.

6. A combination as defined in claim 1, wherein said mirror comprises a selective interference layer and a carrier for said layer, said carrier constituting a color filter.

7. A combination as defined in claim 1, wherein said mirror comprises a selective interference layer which absorbs light in a predetermined range of the visible spectrum.

8. A combination as defined in claim 1, wherein said indicator further comprises light dispersing means provided in the region of said mirror.

9. A combination as defined in claim 1, wherein said indicator comprises two interference mirrors of contrasting light reflecting and light transmitting characteristics.

10. A combination as defined in claim 1, further comprising a fully reflecting mirror overlapping a portion of the first side of said interference mirror.

11. A combination as defined in claim 1, further comprising a camera housing supporting said reference light source and said interference mirror, said mirror being supported by the housing in such a way that the first side thereof can be exposed to scene light.

12. A combination as defined in claim 11, further comprising view finder means provided in said housing, said interference mirror being observable in said view finder means.

13. A combination as defined in claim 11, wherein said housing forms part of a lens reflex camera and further comprising view finder means supported by said housing, said first side of the mirror being located in the path of scene light which enters said view finder means by way of the camera objective.

14. A combination as defined in claim 11, further comprising view finder means provided in said housing, said mirror being observable in said view finder means and said indicator further comprising grey filter means overlapping a portion of said mirror.

15. A combination as defined in claim 14, wherein said filter means is adjacent to the first side of said mirror.

16. A combination as defined in claim 11, further comprising view finder means provided in said housing, said indicator being observable in said view finder means and including two interference mirrors of contrasting light reflecting and light transmitting characteristics and grey filter means overlapping one of said mirrors.

17. A combination as defined in claim 16, wherein said filter means is adjacent to the first side of said one mirror.

18. A combination as defined in claim 11, further comprising means for varying the intensity of said reference light source.

19. A combination as defined in claim 11, further comprising grey filter means having portions of different light transmissivity and means for moving selected portions of said filter means into registry with said mirror.

20. A combination as defined in claim 19, further comprising adjustable exposure value setting means provided in said housing and means for adjusting said setting means in response to movement of said filter means with reference to said mirror.

21. A combination as defined in claim 20, wherein said setting means comprises a diaphragm.

22. A combination as defined in claim 20, wherein said setting means comprises a shutter.

23. A combination as defined in claim 19, wherein the light transmissivity of each portion of said filter means is uniform.

24. A combination as defined in claim 11, further comprising regulating means actuatable to vary the intensity of said reference light source, adjustable exposure value setting means provided in said housing, and means for adjusting said setting means in response to actuation of said regulating means.

25. A combination as defined in claim 24, wherein said setting means includes a diaphragm.

26. A combination as defined in claim 24, wherein said setting means comprises a shutter.

27. A combination as defined in claim 1, wherein said mirror is provided with at least one symbol.

References Cited

UNITED STATES PATENTS

| | | | |
|---|---|---|---|
| 2,112,701 | 3/1938 | Leitz | 356—230 X |
| 3,323,430 | 6/1967 | Cooper, Jr. | 356—230 X |
| 3,323,431 | 6/1967 | Land | 356—230 X |
| 3,416,867 | 12/1968 | Biber | 95—10 B X |

JOSEPH F. PETERS, JR., Primary Examiner

U.S. Cl. X.R.

95—44 R; 350—163; 356—106 R, 230, 234